United States Patent
Lin et al.

(10) Patent No.: US 7,978,280 B2
(45) Date of Patent: Jul. 12, 2011

(54) BACKLIGHT MODULE AND LIQUID CRYSTAL DISPLAY INCORPORATING SAME

(75) Inventors: Yen-Feng Lin, Hsin-Chu (TW); Yu-Yuan Teng, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 826 days.

(21) Appl. No.: 11/946,291

(22) Filed: Nov. 28, 2007

(65) Prior Publication Data

US 2009/0059114 A1   Mar. 5, 2009

(30) Foreign Application Priority Data

Aug. 28, 2007 (TW) ................. 96131813 A (51) Int. Cl.
*G02F 1/13357* (2006.01)
*F21V 17/00* (2006.01)

(52) U.S. Cl. ............. 349/58; 349/65; 362/612; 362/633

(58) Field of Classification Search .................... 349/58, 349/60, 65, 150; 362/612, 613, 621, 631, 362/633
See application file for complete search history.

(56) References Cited

U.S. PATENT DOCUMENTS

| 2007/0159853 A1 | 7/2007 | Xu | |
|---|---|---|---|
| 2008/0055517 A1 * | 3/2008 | Yu | 349/65 |

FOREIGN PATENT DOCUMENTS

| CN | 101000433 | 7/2007 |
|---|---|---|
| TW | 200613829 | 5/2006 |
| TW | 263468 | 10/2006 |

OTHER PUBLICATIONS

English language translation of abstract of TW 200613829.
English language translation of abstract of TW 263468.
English language translation of abstract and pertinent parts of CN 101000433.

* cited by examiner

*Primary Examiner* — Dung T Nguyen
*Assistant Examiner* — Tai Duong
(74) *Attorney, Agent, or Firm* — Thomas, Kayden, Horstemeyer & Risley, LLP (57) ABSTRACT

Disclosed are a backlight module and a liquid crystal display (LCD) incorporating the same. The backlight module includes a frame having an accommodation portion, elastic plate structures, a light guide plate disposed in the frame and light emitting diodes (LEDs). The elastic plate structures extend respectively from both sides of the accommodation portion in the frame. The light emitting diodes are disposed in the accommodation portion, and are fixed between the light guide plate and the respective elastic plate structures.

20 Claims, 7 Drawing Sheets

BACKLIGHT MODULE AND LIQUID CRYSTAL DISPLAY INCORPORATING SAME

RELATED APPLICATIONS

This application claims priority to Taiwan Patent Application Serial Number 96131813, filed Aug. 28, 2007, which is herein incorporated by reference.

BACKGROUND

1. Field of Invention

The present invention relates to a backlight module and a liquid crystal display (LCD) incorporating the same, and more particularly, to a backlight module having a positioning structure and to an LCD including the backlight module.

2. Description of Related Art

A backlight module is one the fundamental parts of an LCD. Since the LCD itself does not emit light, the backlight module is needed to provide the required light source. In the backlight module, a light guide plate is used to direct the light emitted from a backlight source as a planar light source, thereby assuring the uniformity of lightness. A backlight commonly used in the backlight module can be such as a cold cathode fluorescent lamp (CCFL) and a light emitting diode (LED), etc. Although the CCFL is the main trend currently, the demands for using the LED have been increasing daily. In comparison with the CCFL, the LED has the advantages of environmental protection, small size, long operation life, low driving voltage, low power consumption and excellent shock resistance, etc.

In general, when light emitting diodes are applied in an LED backlight module, the light emitting diodes are first disposed on a flexible print circuit board (FPC), and then the flexible print circuit board is folded and inserted into a mold frame for disposing the light emitting diodes adjacent to one side of a light guide plate. Meanwhile, the distance and angle between the light emitting diodes and the light guide plate has quite a great influence on the output luminance and lightness uniformity of the light guide plate, thus affecting the quality of the backlight module, further determining if the LCD using the backlight module is with good quality. Hence, how to accurately position the light emitting diodes to closely contact the light guide plate has become quite an important issue.

Conventional skills intend to make the assembly of the light emitting diodes (or an FPC) and the module to meet the requirement of high accuracy by using specific assembling methods, tape adhesion or the design of positioning the FPC, etc. However, the conventional skill using specific assembling methods cannot actually demand all of the workers to have consistent assembling movements. Especially in mass production, the assembling movements among the works will be different, and it is difficult to establish the standards for determining if the assembling movements are consistent. Further, the conventional skill using tape adhesion causes the increase of the production cost, and not all of the related product mechanisms have sufficient space for receiving the tape for adhesion. If the adhesive area of the tap is not enough, the light emitting diodes will be displaced easily. Further, the conventional skill using the design of positioning the FPC has the following disadvantages. While the product is increasingly miniatured, the FPC or mold frame may not have enough space for forming holes, pillars and ribs to fabricate a positioning device; and the positioning device must have certain tolerances, and thus the assembly of the light emitting diodes (or an FPC) and the module fails to meet the requirement of high accuracy.

SUMMARY

Hence, an aspect of the present invention is to provide a backlight module and an LCD including the same for accurately positioning light emitting diodes to closely contact a light guide plate by directly forming positioning structures on a frame without causing extra production cost.

An embodiment of a backlight module comprises a frame, a first elastic plate structure, a light guide plate and a first LED. The frame has an accommodation portion, and the first elastic plate structure extends from a first side of the accommodation portion. The light guide plate is disposed in the frame, and the first LED is disposed in the accommodation portion and fixed between the light guide plate and the first elastic plate structure.

In another embodiment, a first surface of the first LED contacts the first elastic structure. The first elastic plate structure has a protrusive structure, and the protrusive structure is engaged with a recess portion of the first surface of the first LED.

In still another embodiment, a first surface of the first LED contacts the first elastic plate structure, the first LED having a second surface, and a corner is formed between the first surface and the second surface, and the first elastic plate structure resists the corner.

In yet another embodiment, there is an angle between the first elastic plate structure and the first side of the accommodation portion facing towards the first LED, and the angle is substantially greater than or equal to 90 degrees.

The aforementioned embodiments of the backlight module may further comprise a second elastic plate and a second LED, wherein the second elastic plate structure extends from a second side of the accommodation portion opposite to the first side, and the second LED is disposed in the accommodation portion and fixed between the light guide plate and the second elastic plate structure. The structures of the second elastic plate structure and the second LED are similar to those of the first elastic plate structure and the first LED.

In one embodiment, the first elastic plate structure is connected to the second elastic structure.

The aforementioned embodiments of the backlight module may further comprise at least one third LED disposed between the first LED and the second LED. The first LED, the second LED and the third LED are disposed on the FPC, and the FPC is folded and inserted into the accommodation portion.

Further, an LCD of the present invention comprises the aforementioned backlight module.

Hence, the application of the present invention can form positioning structures directly on a frame without causing extra production cost; enhance the stability of module assembling; provide stable light source for improving the optical problems of lower luminance and poor lightness uniformity; provide more frame space for use since the elastic plate structures (positioning structures) occupy small space.

It is to be understood that both the foregoing general description and the following detailed description are examples, and are intended to provide further explanation of the present invention as claimed.

BRIEF DESCRIPTION OF THE DRAWINGS

The present invention will become more fully understood from the detailed description given herein below and the accompanying drawings, given by way of illustration only and thus not intended to be limitative of the present invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

According to the present invention, elastic plate structures are directly formed a frame, thereby enabling light emitting diodes to closely contact a light guide plate and generating interference among the elastic plate structures, the light emitting diodes, and the light guide plate. Since when the elastic plate structures are formed simultaneously the frame is fabricated, no extra production cost is caused. Hereinafter, various embodiments of the present invention are described.

Embodiment 1

Figure 1A:
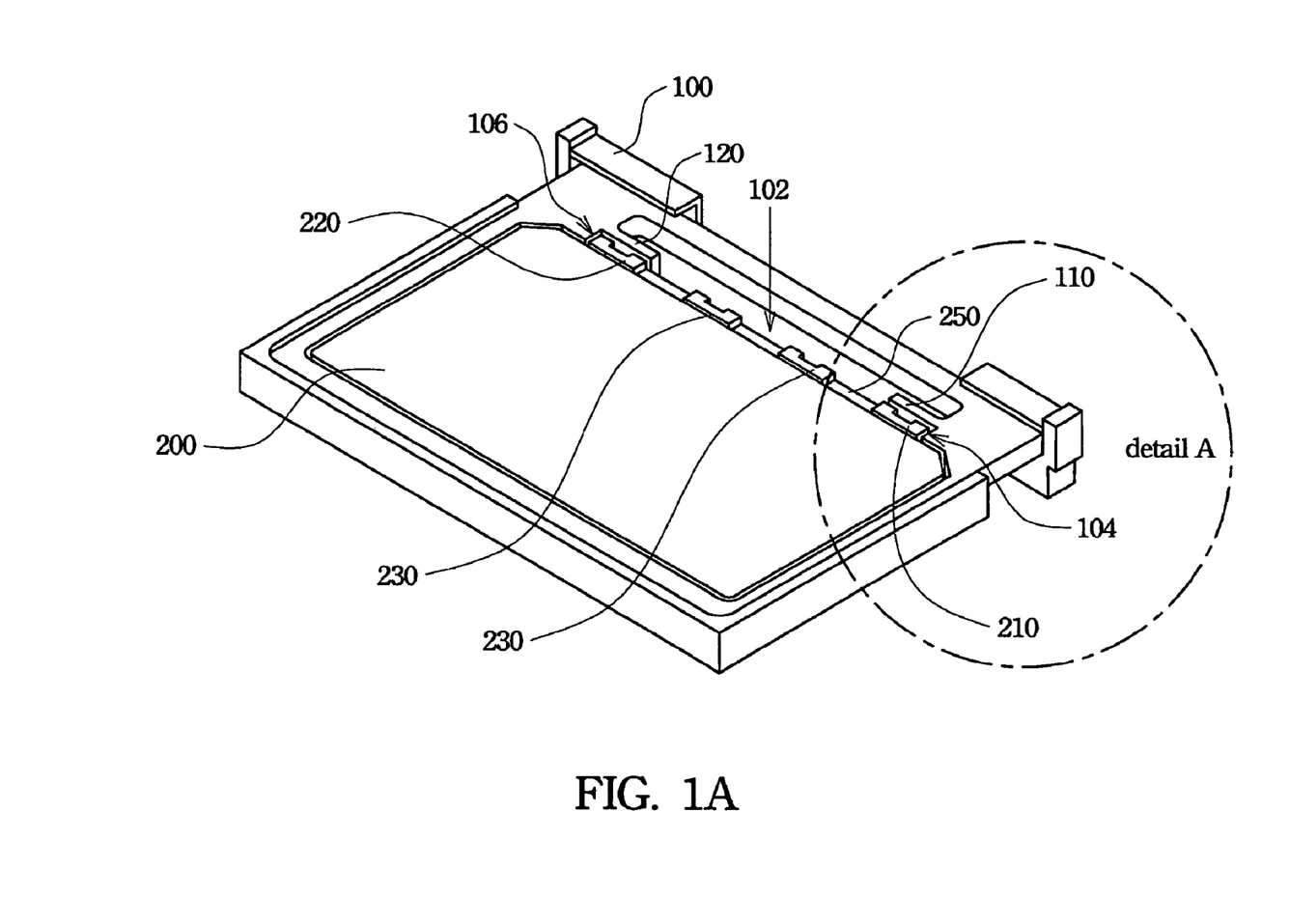
FIG. 1A is a schematic diagram illustrating the structure of a backlight module according to a first embodiment of the present invention.
Figure 1B:
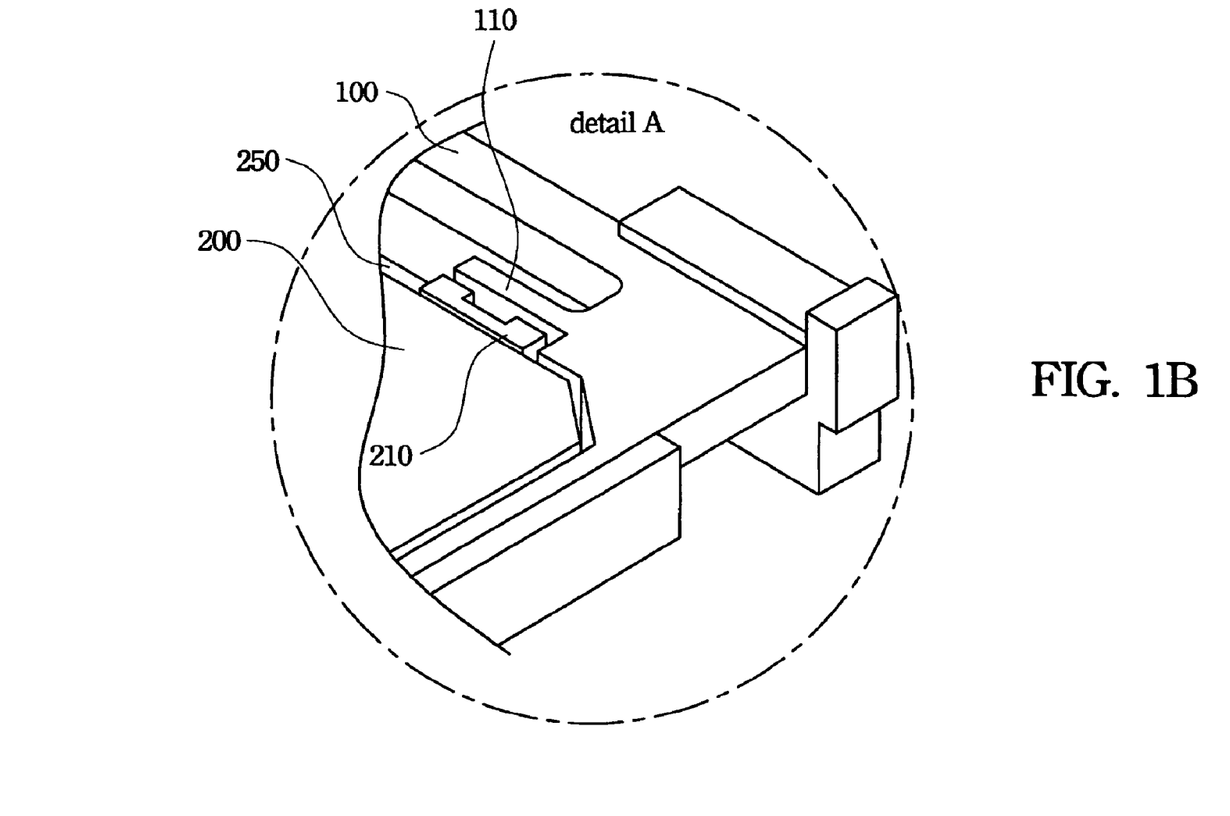
FIG. 1B is schematic enlarged diagram illustrating a detail A shown in FIG. 1A.

Referring to FIG. 1A and FIG. 1B, FIG. 1A is a schematic diagram illustrating the structure of a backlight module according to a first embodiment of the present invention, and FIG. 1B is schematic enlarged diagram illustrating a detail A shown in FIG. 1A. In this embodiment, the backlight module comprises a frame 100, an elastic plate structure 110, an elastic plate structure 120, a light guide plate 200, and LEDs 210 and 220, wherein the light guide plate 200 is disposed in the frame 100. The frame 100 has an accommodation portion 102 used for receiving the LEDs 210 and 220. At least one LED 230 can be disposed between the LED 210 and the LED 220. The LEDs 210, 220 and 230 are disposed on an FPC 250. The elastic plate structures 110 and 120 extend respectfully from both sides 104 and 106 of the accommodation portion 102 of the frame 100. When the backlight module is assembled, a worker first folds the FPC 250 back into the accommodation portion 102 of the frame 100, and then clips the LED 210 between the light guide plate 200 and the elastic plate structure 110; and the LED 220 between the light guide plate 200 and the elastic plate structure 120, thereby fixing the LEDs 210, 220 and 230 on the desired positions, thus achieving accurately positioning.

Since the related structure between the LED 210 and the elastic plate structure 110 is similar to that between the LED 220 and the elastic plate structure 120, only the related structure between the LED 210 and the elastic plate structure 110 is explained hereinafter. As shown in FIG. 1B, when the LED 210 is inserted between the light guide plate 200 and the elastic plate structure 110, the elasticity of the elastic plate structure 110 can force the LED 210 to be tightly fit in between the light guide plate 200 and the elastic plate structure 110, and may result in some interference among the elastic plate structure 110, the LED 210 and the light guide plate 200, so that the LED 210 can be naturally fixed on an appropriate position of one side of the light guide plate 200.

Hence, with the design of the elastic plate structures 110 and 120 according to this embodiment, the worker does not need to worry if the LEDs 210, 220 and 230 are aligned to or tightly fit to one side of the light guide plate 200; and also does not need to use the method such as tape adhesion to fix the LEDs 210, 220 and 230, thus enhancing the stability of module assembling, providing stable light source, and further improving the optical problems of lower luminance and poor lightness uniformity. Besides, the lengths of the elastic plate structures 110 and 120 are merely required to be sufficient to clip the LEDs 210 and 220, and thus the space occupied by the elastic plate structures 110 and 120 is quite small, so that more space can be provided in the frame 100 for use.

Although this embodiment uses two elastic plate structures 110 and 120 as an example for explanation, the present invention also may use only one elastic plate structure 110 or 120 to achieve the purpose of accurately positioning and fixing the LEDs 210, 220 and 230.

Embodiment 2

Figure 2A:
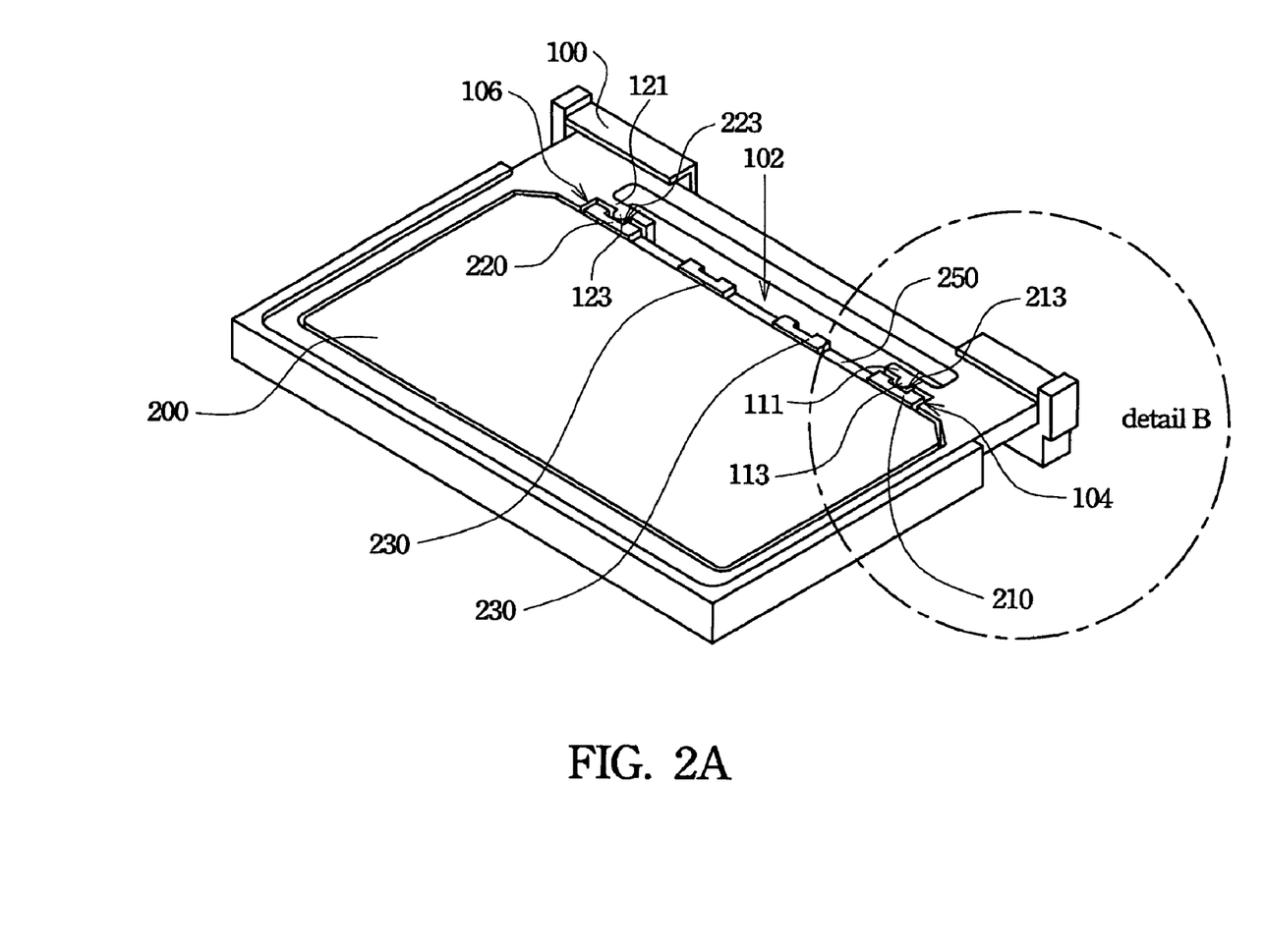
FIG. 2A is a schematic diagram illustrating the structure of a backlight module according to a second embodiment of the present invention.
Figure 2B:
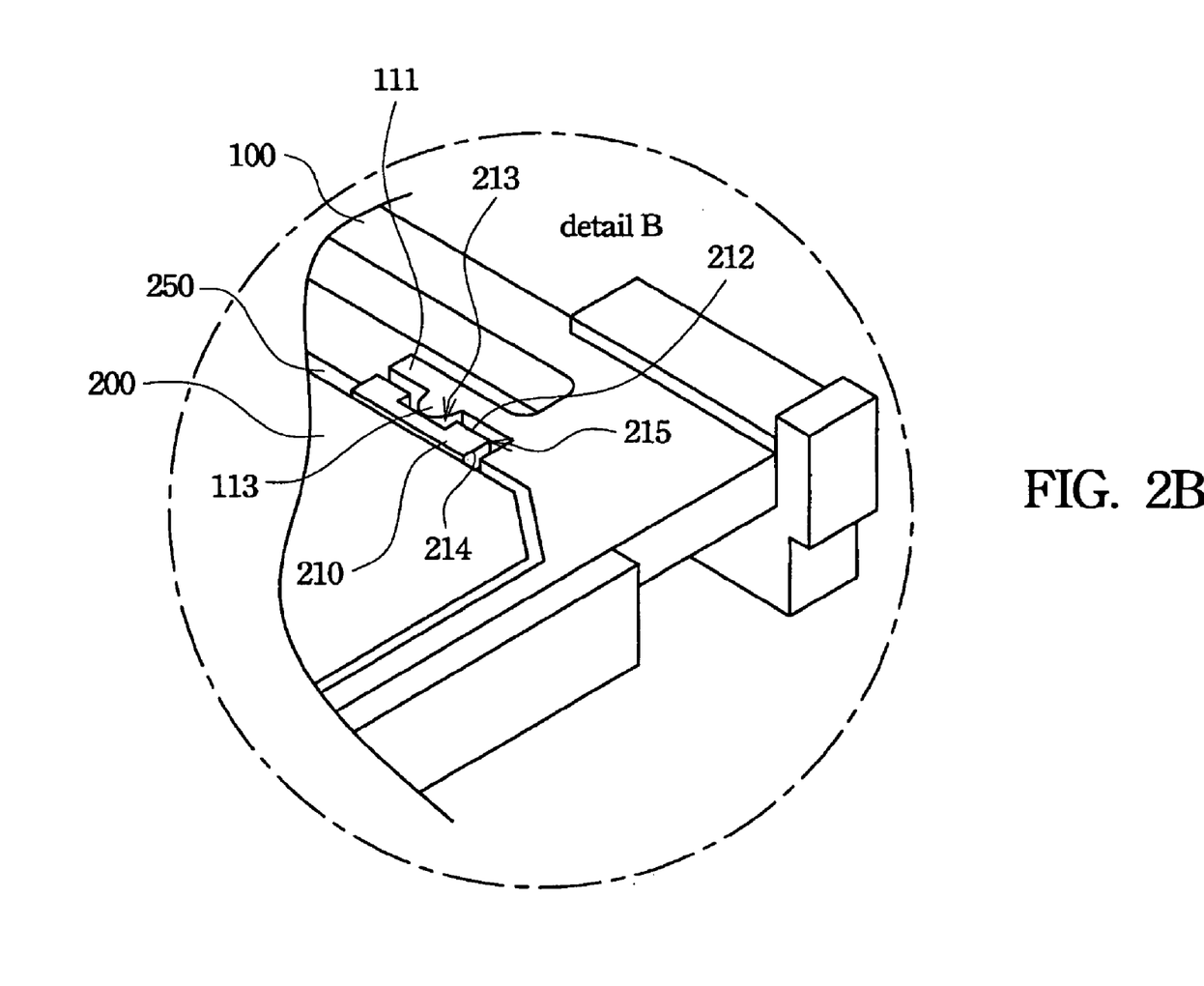
FIG. 2B is schematic enlarged diagram illustrating a detail B shown in FIG. 2A.

Referring to FIG. 2A and FIG. 2B, FIG. 2A is a schematic diagram illustrating the structure of a backlight module according to a second embodiment of the present invention, and FIG. 2B is schematic enlarged diagram illustrating a detail B shown in FIG. 2A. This embodiment uses elastic plate structures 111 and 121 to replace the elastic plate structures 110 and 120 of the first embodiment shown in FIG. 1A. In this embodiment, protrusive structures 113 and 123 are formed on the side surfaces of the elastic plate structures 111 and 121 corresponding to the LEDs 110 and 210, so as to be engaged with the corresponding recess portions 213 and 223 formed on the LEDs 210 and 220, thereby enhancing the fixing of the LEDs 210 and 220. The protrusive structures 113 and 123 can be such as pillar structures or other proper structures. When the backlight module is assembled, a worker first folds the FPC 250 back into the accommodation portion 102 of the frame 100, and then clips the LED 210 between the light guide plate 200 and the elastic plate structure 111; and the LED 220 between the light guide plate 200 and the elastic plate structure 121, and also forces the protrusive structures 113 and 123 to be engaged with the recess portions 213 and 223, thereby fixing the LEDs 210, 220 and 230 on the desired positions and achieving accurately positioning.

Since the related structure between the LED 210 and the elastic plate structure 111 is similar to that between the LED 220 and the elastic plate structure 121, only the related structure between the LED 210 and the elastic plate structure 111 is explained hereinafter. As shown in FIG. 2B, a surface 212 of the LED 210 contacts the elastic plate structure 111. When the LED 210 is inserted between the light guide plate 200 and the elastic plate structure 111, the elasticity of the elastic plate structure 111 can force the LED 210 to be tightly fit in between the light guide plate 200 and the elastic plate structure 111, and the protrusive structure 113 of the elastic plate structure 111 is engaged with the recess portion 213 of the LED 210, so that the LED 210 can be reinforcedly fixed on an appropriate position of one side of the light guide plate 200. Besides, the LED 210 has a surface 214, and a corner 215 is formed between the surface 214 and the surface 212, and the elastic plate structure 111 resists the corner 215.

Hence, except the aforementioned advantages of the first embodiment, with the use of the elastic plate structures 111 and 121 having the protrusive structures 113 and 123 according to this embodiment, the LED 210 and the LED 220 can be fixed reinforcedly.

Similarly, although this embodiment uses two elastic plate structures 111 and 121 as an example for explanation, the present invention also may use only one elastic plate structure 111 or 121 to achieve the purpose of accurately positioning and fixing the LEDs 210, 220 and 230.

Embodiment 3

Figure 3A:
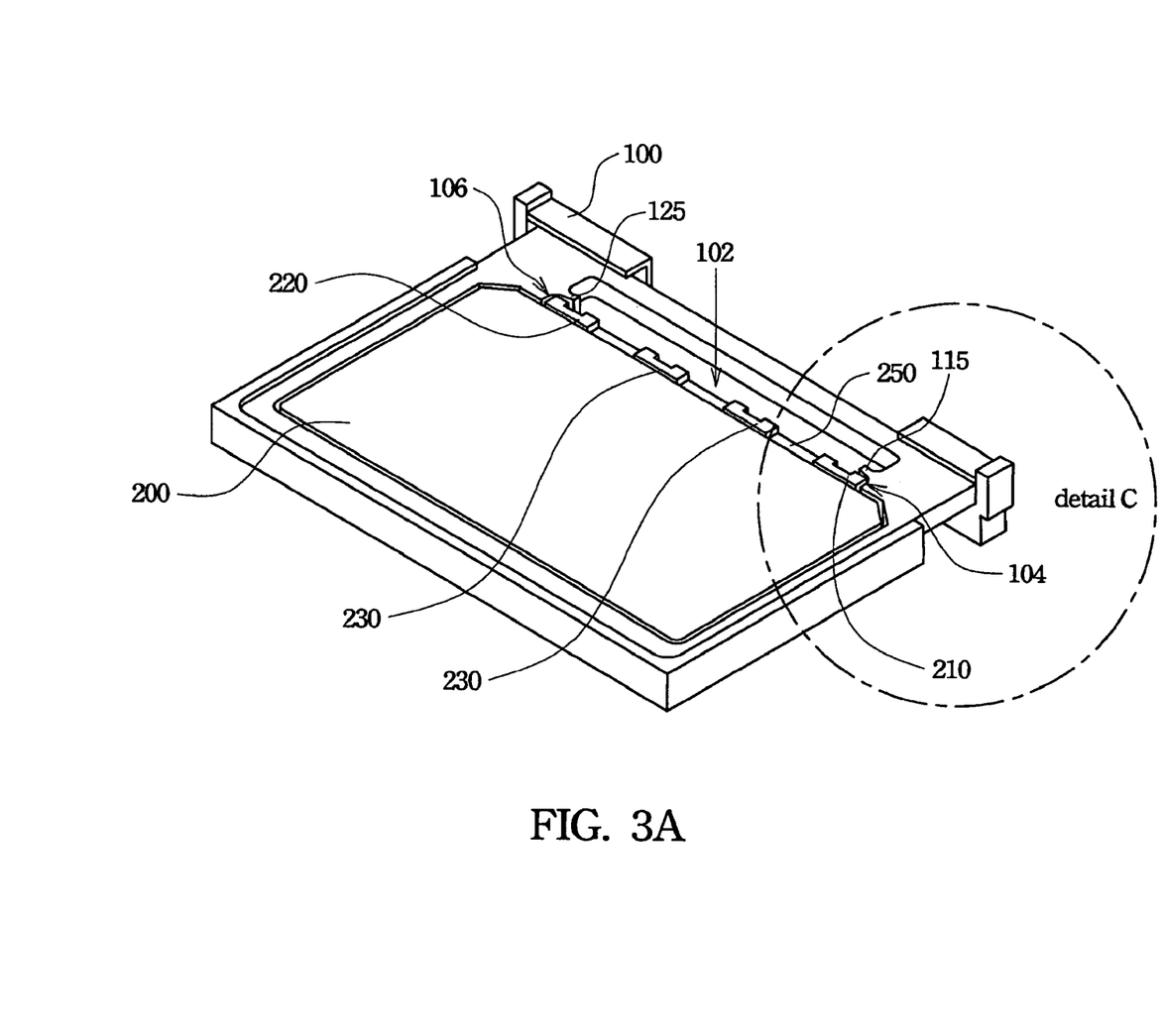
FIG. 3A is a schematic diagram illustrating the structure of a backlight module according to a third embodiment of the present invention.
Figure 3B:
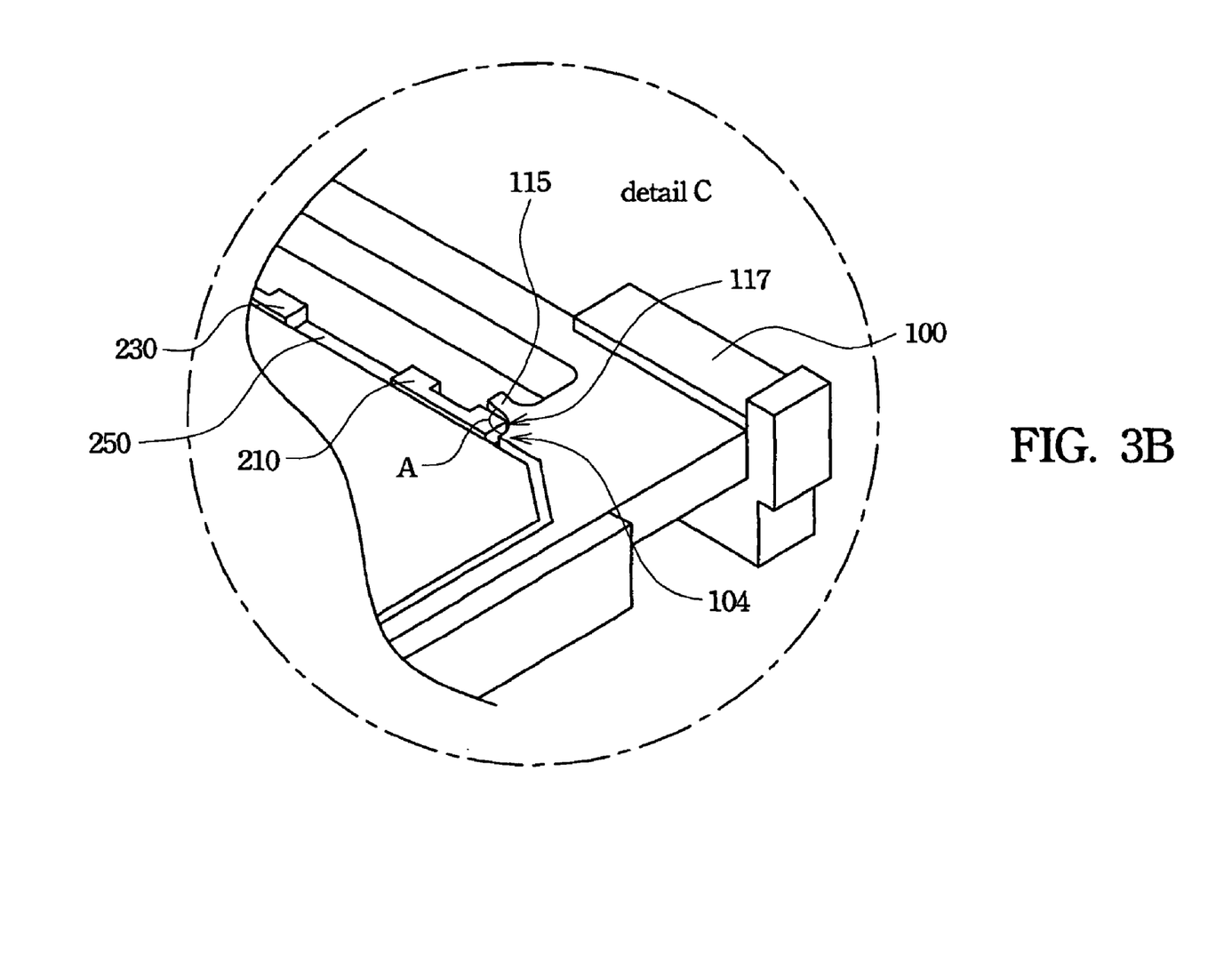
FIG. 3B is schematic enlarged diagram illustrating a detail C shown in FIG. 3A.

Referring to FIG. 3A and FIG. 3B, FIG. 3A is a schematic diagram illustrating the structure of a backlight module according to a third embodiment of the present invention, and FIG. 3B is schematic enlarged diagram illustrating a detail C shown in FIG. 3A. This embodiment uses elastic plate structures 115 and 125 to replace the elastic plate structures 110 and 120 of the first embodiment shown in FIG. 1A. In this embodiment, there are angles between the elastic plate structures 115 and 125 and both sides 104 and 106 of the accommodation portion 102 of the frame 100 facing towards the LEDs 210 and 220, and the angles are greater than 90 degrees, and in the first embodiment, the angles similar thereto are about equal to 90 degrees.

Since the related structure between the LED 210 and the elastic plate structure 115 is similar to that between the LED 220 and the elastic plate structure 125, only the related structure between the LED 210 and the elastic plate structure 115 is explained hereinafter. As shown in FIG. 3B, a surface 212 of the LED 210 contacts the elastic plate structure 115. When the LED 210 is inserted between the light guide plate 200 and the elastic plate structure 115, the elastic plate structure 115 can resist an corner 117 having an angle A formed by the elastic plate structure 115 and the side 104, wherein the angle A is about greater than 90 degrees, so that the LED 210 can be fixed between the light guide plate 200 and the elastic plate structure 115.

Hence, except the aforementioned advantages of the first embodiment, the elastic plate structures 115 and 125 of this embodiment require smaller space, and thus more space in the frame 100 can be saved for use.

Similarly, although this embodiment uses two elastic plate structures 115 and 125 as an example for explanation, the present invention also may use only one elastic plate structure 115 or 125 to achieve the purpose of accurately positioning and fixing the LEDs 210, 220 and 230.

Embodiment 4

Figure 4:
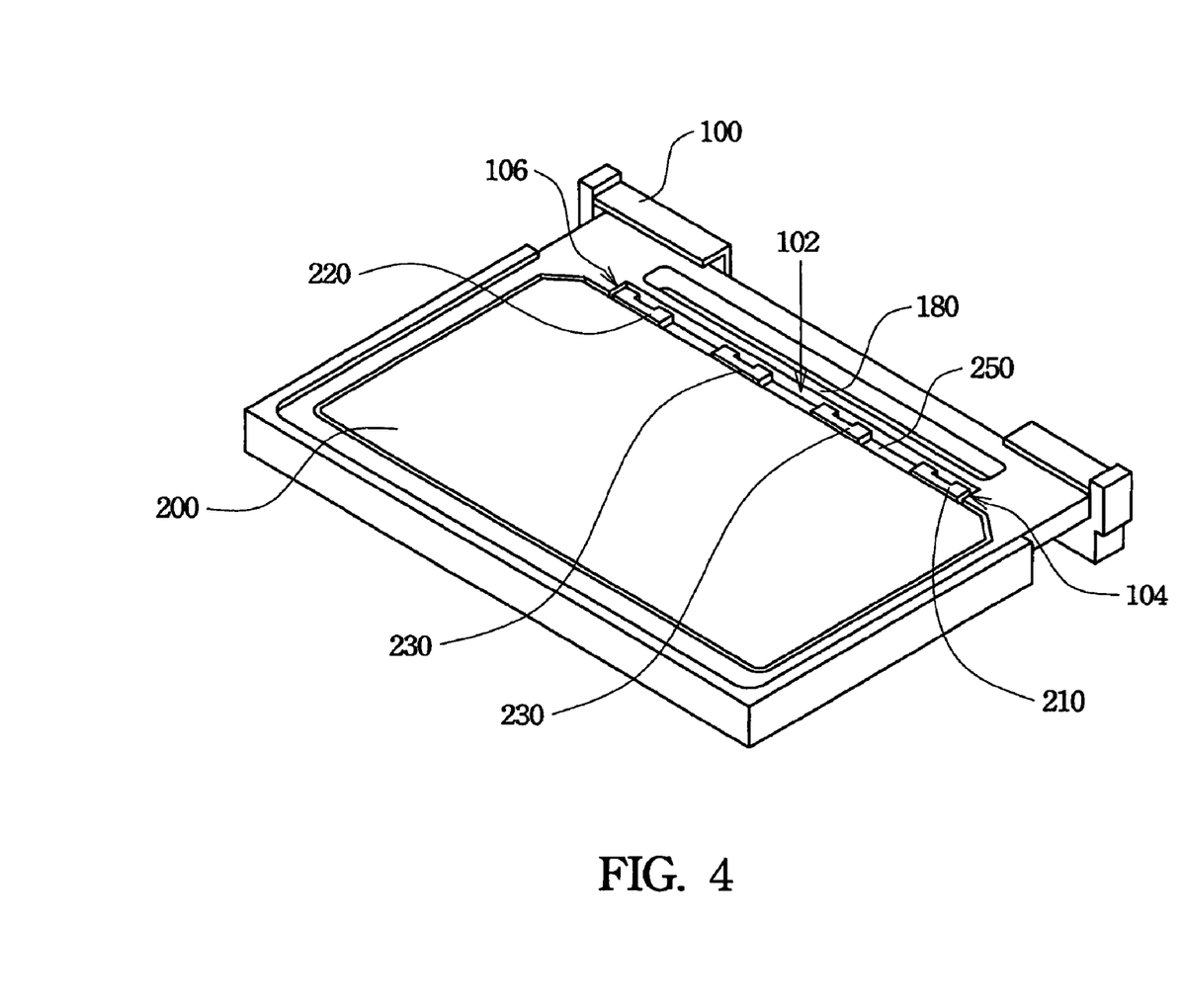
FIG. 4 is a schematic diagram illustrating the structure of a backlight module according to a fourth embodiment of the present invention.

Referring to FIG. 4, FIG. 4 is a schematic diagram illustrating the structure of a backlight module according to a fourth embodiment of the present invention. This embodiment uses an elastic plate structure 180 to replace the elastic plate structures 110 and 120 of the first embodiment shown in FIG. 1A, wherein the elastic plate structure 180 connects both sides 104 and 106 of the accommodation portion 102 of the frame 100 together, i.e. the elastic plate structures 110 and 120 of the first embodiment are connected. The advantages and function of this embodiment are similar to those of the first embodiment, and thus are not stated herein again.

Besides, the backlight module of the present invention can be applied in an LCD.

It can be known from the embodiments described above, the present invention has the advantages of avoiding the extra production cost; enhancing the stability of module assembling and providing stable light source, thereby improving the optical problems of lower luminance and poor lightness uniformity; and providing more frame space for use.

While the present invention has been described by way of example and in terms of preferred embodiment, it is to be understood that the present invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A backlight module, comprising:
   a frame having an accommodation portion;
   a first elastic plate structure extending from a first side of the accommodation portion;
   a light guide plate disposed in the frame; and
   a first light emitting diode (LED) disposed in the accommodation portion and fixed between the light guide plate and the first elastic plate structure, wherein a first surface of the first LED contacts the first elastic plate structure, the first LED has a second surface, a corner is formed between the first surface and the second surface, and the first elastic plate structure covers the corner.

2. The backlight module of claim 1, wherein a first surface of the first LED contacts the first elastic structure, the first elastic plate structure has a protrusive structure, and the protrusive structure is engaged with a recess portion of the first surface of the first LED.

3. The backlight module of claim 1, wherein there is an angle between the first elastic plate structure and the first side facing towards the first LED, and the angle is substantially greater than or equal to 90 degrees.

4. The backlight module of claim 1, further comprising:
   a second elastic plate structure extending from a second side of the accommodation portion, wherein the second side is opposite to the first side; and
   a second LED disposed in the accommodation portion and fixed between the light guide plate and the second elastic plate structure.

5. The backlight module of claim 4, wherein a second surface of the second LED contacts the second elastic structure, the second elastic plate structure has a protrusive structure, and the protrusive structure is engaged with a recess portion of the second surface of the second LED.

6. The backlight module of claim 4, wherein a second surface of the second LED contacts the second elastic plate structure, the second LED has a third surface, a corner is formed between the third surface and the second surface, and the second elastic plate structure covers the corner.

7. The backlight module of claim 4, wherein there is an angle between the second elastic plate structure and the second side facing towards the second LED, and the angle is substantially greater than or equal to 90 degrees.

8. The backlight module of claim 4, further comprising:
   a flexible print circuit board (FPC), wherein the first LED and the second LED are disposed on the FPC, and the FPC is folded and inserted into the accommodation portion.

9. The backlight module of claim 4, further comprising:
   at least one third LED disposed between the first LED and the second LED.

10. The backlight module of claim 9, further comprising:
an FPC, wherein the first, second, and third LEDs are disposed on the FPC, and the FPC is folded and inserted into the accommodation portion.

11. A liquid crystal display (LCD), comprising:
a backlight module, comprising
a frame having an accommodation portion;
a first elastic plate structure extending from a first side of the accommodation portion;
a light guide plate disposed in the frame; and
a first LED disposed in the accommodation portion and fixed between the light guide plate and the first elastic plate structure, wherein a first surface of the first LED contacts the first elastic plate structure, the first LED has a second surface, a corner is formed between the first surface and the second surface, and the first elastic plate structure covers the corner.

12. The liquid crystal display of claim 11, wherein a first surface of the first LED contacts the first elastic structure, the first elastic plate structure has a protrusive structure, and the protrusive structure is engaged with a recess portion of the first surface of the first LED.

13. The liquid crystal display of claim 11, wherein there is an angle between the first elastic plate structure and the first side facing towards the first LED, and the angle is substantially greater than or equal to 90 degrees.

14. The liquid crystal display of claim 11, further comprising:
a second elastic plate structure extending from a second side of the accommodation portion, wherein the second side is opposite to the first side; and
a second LED disposed in the accommodation portion and fixed between the light guide plate and the second elastic plate structure.

15. The liquid crystal display of claim 14, wherein a second surface of the second LED contacts the second elastic structure, the second elastic plate structure has a protrusive structure, and the protrusive structure is engaged with a recess portion of the second surface of the second LED.

16. The liquid crystal display of claim 14, wherein a second surface of the second LED contacts the second elastic plate structure, the second LED has a third surface, a corner is formed between the third surface and the second surface, and the second elastic plate structure covers the corner.

17. The liquid crystal display of claim 14, wherein there is an angle between the second elastic plate structure and the second side facing towards the second LED, and the angle is substantially greater than or equal to 90 degrees.

18. The liquid crystal display of claim 14, further comprising:
an FPC, wherein the first LED and the second LED are disposed on the FPC, and the FPC is folded and inserted into the accommodation portion.

19. The liquid crystal display of claim 14, further comprising:
at least one third LED disposed between the first LED and the second LED.

20. The liquid crystal display of claim 19, further comprising:
an FPC, wherein the first, second, and third LEDs are disposed on the FPC, and the FPC is folded and inserted into the accommodation portion.

* * * * *